United States Patent [19]
Jacob et al.

[11] Patent Number: 6,059,260
[45] Date of Patent: May 9, 2000

[54] FUME HOOD EXHAUST TERMINAL HAVING AN ULTRASONIC MOTOR DRIVE ACTUATOR

[75] Inventors: Steven D. Jacob, Crystal Lake; William H. Gorski, Long Grove, both of Ill.

[73] Assignee: Siemens Building Technologies, Inc., Buffalo Grove, Ill.

[21] Appl. No.: 09/065,921

[22] Filed: Apr. 24, 1998

[51] Int. Cl.[7] ................................................. F16K 31/04
[52] U.S. Cl. ........................ 251/129.12; 318/453; 454/61
[58] Field of Search .................... 251/129.11, 129.12; 454/61; 307/66; 318/453

[56] References Cited

U.S. PATENT DOCUMENTS

| | | | |
|---|---|---|---|
| 4,205,783 | 6/1980 | Dietsche et al. | 251/129.11 X |
| 4,915,074 | 4/1990 | Arai | 251/129.11 X |
| 4,930,746 | 6/1990 | Reinicke et al. | 251/129.11 |
| 5,100,101 | 3/1992 | Shah | 251/129.11 |
| 5,169,121 | 12/1992 | Blanco et al. | 251/129.12 |
| 5,178,361 | 1/1993 | Gilbert et al. | 251/129.11 X |
| 5,184,593 | 2/1993 | Kobayashi | 251/129.11 X |
| 5,278,454 | 1/1994 | Strauss et al. | 307/66 X |
| 5,411,241 | 5/1995 | Nilsson et al. | 251/129.11 X |
| 5,518,446 | 5/1996 | Jacob | 454/61 |
| 5,519,295 | 5/1996 | Jatnieks | 307/66 X |
| 5,833,529 | 11/1998 | Jacob | 251/129.12 X |

OTHER PUBLICATIONS

R.B. Pressly and C.P. Mentesana, "Piezoelectric Motor Development at AlliedSignal Inc. Kansas City Division", AlliedSignal Inc. publication, Nov. 1994.

R.J. Babyak, "Motor, Fans & Blowers", *Appliance Manufacturer*, Mar. 1994.

*Primary Examiner*—John Rivell
*Attorney, Agent, or Firm*—Greer, Burns & Crain, Ltd

[57] ABSTRACT

A fume hood exhaust terminal for controlling gas flow in an exhaust duct has an electrically powered ultrasonic motor driven actuator for angularly positioning a damper in the terminal. The circuitry of the terminal includes a power failure detection circuit which includes the capability of storing sufficient power to place the damper in a preferred position until power is restored to the exhaust terminal.

7 Claims, 2 Drawing Sheets

FUME HOOD EXHAUST TERMINAL HAVING AN ULTRASONIC MOTOR DRIVE ACTUATOR

The present invention generally relates to laboratory fume hood installations, and particularly to exhaust terminals that are used in such installations. Still more particularly, the present invention relates to fume hood exhaust terminals that have an ultrasonic motor driven actuator for controlling the position of a damper in a fume hood exhaust terminal.

Fume hoods are provided in laboratories for removing toxic fumes and gases in the air that are often produced during experimental work that is done in the laboratories. Generally, fume hoods include an enclosure with doors that can be opened vertically and/or horizontally to enable technicians to gain access to the interior of the fume hood for doing experimental work. The fume hoods generally have an exhaust duct provided to expel air and gaseous fumes so that the laboratory technicians will not be exposed to them while working near the hood.

Most currently marketed fume hood controllers control the flow of air through the fume hood and such controllers generally control the flow as a function of the desired average face velocity of the effective opening of the fume hood. The average face velocity is generally defined as the flow of air into the fume hood per square foot of open face area of the fume hoods, with the size of the open face area being a function of the position of the one or more moveable doors that are provided on the front of the fume hood. The average face velocity is determined by the operators of the facility where the fume hoods are located, and therefore can be set at a higher or lower face velocity that is consistent with the operator's sense of what is a safe value, and yet is not wasteful of energy costs. Such average face velocities are generally in the range of 100 ro 150 feet per minute for each square foot of open area when technicians are present in the area. Lower face velocities are often employed during periods when no activity is occurring in the facility.

Fume hood installations can also vary in their design and operation. Some installations have controllers that control a variable speed drive for driving a fan motor for the purpose of modulating the flow of air through the fume hood to provide the desired average face velocity. There are also many installations which have a single blower in a common exhaust manifold with a number of fume hoods having individual exhaust ducts connected to the manifold, with the flow of air through each fume hood being controlled by a damper mechanism. The damper mechanism can be located in a fume hood exhaust terminal generally of the type as disclosed in my prior U.S. Pat. No. 5,518,446, assigned to the same assignee as the present invention (albeit that the assignee's name has been changed since the patent issued). As disclosed in my '446 patent, there are many damper controlled applications which utilize a pneumatic actuator for the purpose of positioning the damper to modulate the flow of air through the hood. While such pneumatic actuators do operate reliably, there has been a need for an electrically driven linear actuator which is cost-effective and reliable in its operation. To that end, I have developed an electrically driven linear actuator which is disclosed in my prior Patent (Docket 61589).

While rotary electrical actuators are known to have been used for damper applications, there is a need for a, reliable, powerful and fast acting electrically driven rotary actuator for use in fume hood exhaust terminals.

Accordingly, it is a primary object of the present invention to provide an improved fume hood exhaust terminal having an electrical ultrasonic motor driven actuator for use in fume hood installations, as well as other applications, which actuator is reliable and compact in design.

Another object of the present invention is to provide such an improved fume hood exhaust terminal having an ultrasonic motor actuator which has rapid operation to quickly change the damper position and thereby accurately control the modulation of the flow through the fume hood during operation.

Still another object of the invention is to provide an improved fume hood exhaust terminal having an electrical ultrasonic motor driven actuator that can be easily installed as a retrofit for an existing pneumatic damper, and wherein the controller need not be modified to any significant extent because the control signals that had previously controlled the pneumatic actuator can be used to control the electrical ultrasonic motor driven actuator.

Yet another object of the present invention is the provision for relatively simple electrical drive circuitry which has the capability of placing the damper in a preferred position even if the power to the circuitry is interrupted, thereby providing an emergency fail safe capability.

Another object of the present invention is to provide an improved fume hood exhaust terminal having a drive circuitry which is unique in its design and operation and which is adapted to reliably drive the actuator motor while minimizing the possibility of damaging the drive motor by continuing to power the motor when the actuator mechanism has reached the end of its travel in either direction.

Still another object of the present invention is to provide an improved fume hood exhaust terminal which is quiet in its operation, and which has a relatively low power consumption relative to its output torque.

Other objects and advantages will become apparent upon reading the following detailed description, while referring to the attached drawings, in which.

DETAILED DESCRIPTION

Broadly stated, the present invention is directed to an improved fume hood exhaust terminal having an electrical ultrasonic motor driven actuator for controlling the angular position of a damper for modulating the flow through the exhaust duct of a fume hood. The desired flow through the exhaust duct is determined by a fume hood controller that is not in and of itself a part of the present invention. The present invention is directed to a fume hood exhaust terminal having an electrical ultrasonic motor driven actuator and control circuitry for driving the same.

Figure 1:
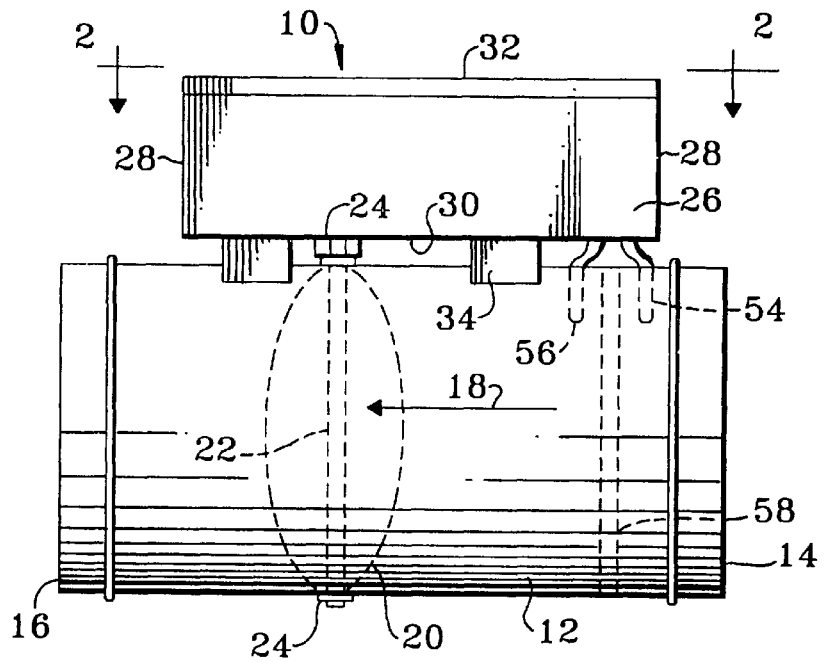
FIG. 1 is a side view of a fume hood exhaust terminal embodying the present invention.

Turning now to the drawings, and particularly FIG. 1, a fume hood exhaust terminal, indicated generally at 10, is shown in side view and generally comprises a tubular duct segment 12 having an upstream end 14, a downstream end 16, with flow thereby passing through the duct segment in the direction of the arrow 18. A flat generally disk-shaped rigid damper 20 is positioned inside of the duct segment 12 and is preferably mounted to a shaft 22 that is rotatably journaled in a polymeric low friction, preferably Teflon-type bushing 24 in both the upper and lower ends, with the shaft extending through suitable apertures (not shown) in the tubular segment 12. As an alternative to the damper shaft 22 which extends through the damper 20, there may be upper and lower cylindrical portions that extend from near the periphery of the damper 20, if desired. In either type of construction, the shaft and the cylindrical portions are coextensive along an axis that passes through the center of the damper 20. The rotation of the shaft is mechanically prevented from rotating more than 90° with electrical switches 21 (FIG. 3) being provided to disconnect the control signal when the end has been reached.

It should also be understood that the exhaust terminal shown in FIG. 1 should not be limited to a disk-shaped rigid damper as particularly illustrated, but can be used with any exhaust terminal having a damper construction which is controlled by pivoting a shaft that controls the amount of flow through the damper duct. One such type of damper is disclosed in U.S. Pat. No. 4,155,289 issued to Garriss. It should also be understood that while the present invention is directed to an exhaust terminal, it is meant to be considered in a broad sense, in that a damper construction can be incorporated in a unitary exhaust terminal, or can be installed in an exhaust duct, or can just as easily be installed in a portion of the exhaust duct of the fume hood itself. It is within the scope of the present invention, that the present invention may be incorporated in the construction of the fume hood by the manufacturer of the fume hood.

Figure 2:
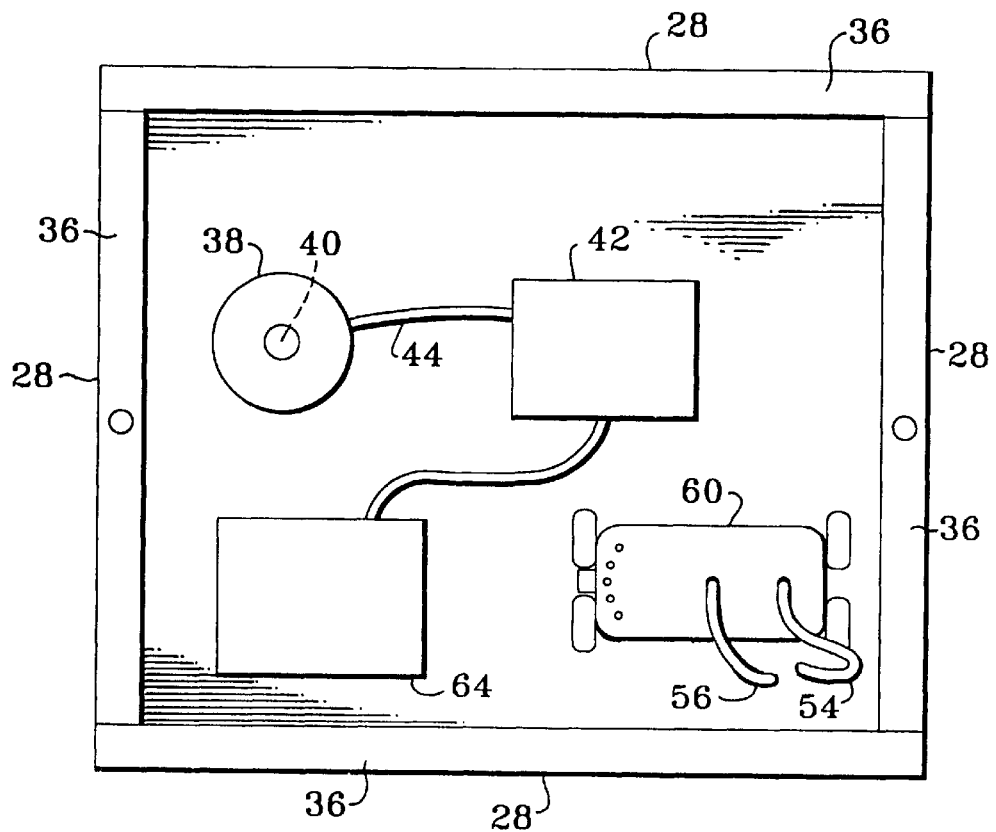
FIG. 2 is a top view taken generally along the line 2—2 of FIG. 1, and illustrating the present invention.

The apparatus includes an enclosure 26 which has four sidewalls 28, a bottom wall 30 and a top plate 32. The enclosure 26 is supported by and attached to the tubular segment 12 by mounts 34 that are attached by suitable attachment means, such as weldments, bolts, sheet metal screws, or the like. Referring to FIG. 2, the enclosure 26 also has a narrow top flange 36 that extends around the entire periphery of the enclosure. This provides a surface that is suitable for attaching the top plate 32 to the enclosure by screws or the like. The shaft 22 extends upwardly through the bottom wall 30 of the enclosure where it is coupled to an electrically powered ultrasonic motor 38 having an output shaft 40.

The motor 38 is driven by a drive module 42 via lines 44. The motor is preferably a Model USR60 ultrasonic motor manufactured by the Shinsei company of Japan. The motor is a 60 millimeter size, operates on 12 VDC and has a 100 rpm maximum speed, with an output torque of 0.4 Newton-meters. The motor driver is also manufactured by Shinsei and is Model D2060. The motor driver 42 has a variable potentiometer 48 which can be used to adjust the operating speed of the motor.

Referring again to FIG. 1, the apparatus includes hollow tubes 54 and 56 which are positioned on opposite sides of an annular flange 58, with the tubes extending to a transmitter 60 which feeds information relating to the differential pressure across the flange 58 back to the fume hood controller. The controller uses this information to determine the proper air flow through the segment 12. The manner in which the flow is measured through the segment 12 is not considered to be a part of the present invention, although it is understood that many of such exhaust terminals often have this capability. It should also be understood that the flow of air through the exhaust can be measured upstream or downstream of the tubular duct segment 12.

Figure 3:
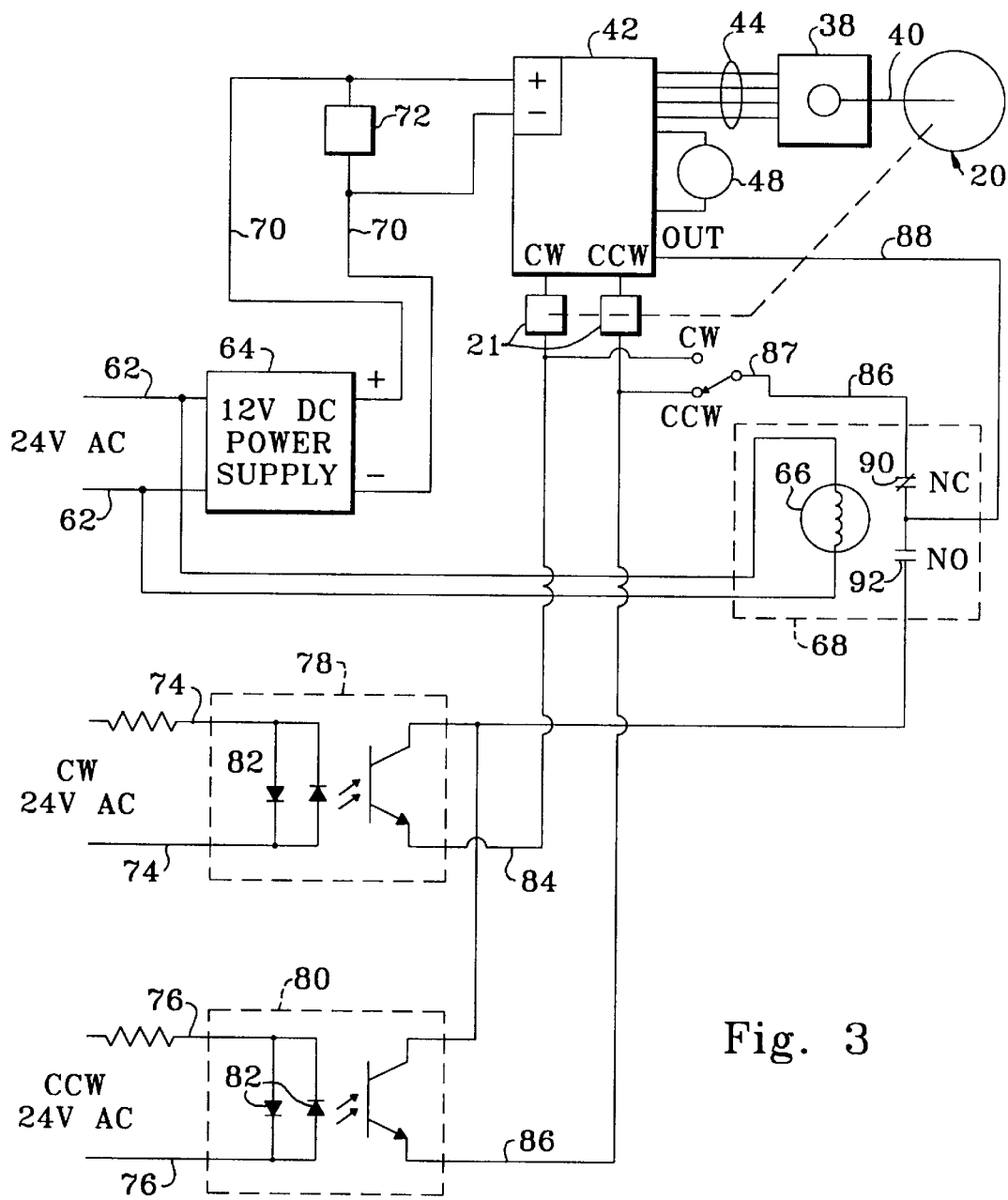
FIG. 3 is a detailed electrical schematic diagram illustrating the preferred embodiment of the electrical circuitry that is used to detect power failure and to drive the ultrasonic motor of the exhaust terminal embodying the present invention.

Turning now to FIG. 3 which illustrates the circuitry that is employed in the preferred embodiment of the present invention, 24 volts alternating current (VAC) is applied at lines 62 which connect to a power supply 64 and to the coil 66 of a relay 68. The output of the power supply 64 provides a 12 volts direct current (VDC) output which is connected via lines 70 to a capacitor bank 72 and to the drive module 42.

Control signals from a fume hood controller for causing clockwise and counterclockwise movement of the motor 38 is applied via lines 74 and 76, respectively. The lines 74 are connected to an opto-coupler 78 and lines 76 are connected to opto-coupler 80. During normal operation, the fume hood controller determines whether the damper position should be changed to vary the flow of air through the terminal to maintain the desired face velocity. When movement in the appropriate direction is needed, voltage is applied to one set of the input lines 74 or 76, and the voltage is maintained as long as the controller determines that damper movement is needed. When voltage is not being applied, the motor is stopped and the damper position is thereby maintained.

It should also be understood that the apparatus of the present invention can be adapted to cause the actuator to fully close the damper in the event of a power loss. Such a result may be desired if the damper is controlling the operation of an air supply damper for a room. Depending upon the application, the safety consideration may be for fully opening the damper or fully closing it. Both types of applications are within the scope of the present invention.

The capacitor bank 72 preferably has a relatively large capacitance, such as about 0.2 farads, for example. The most important consideration is that the capacitor 72 provide sufficient power so that the actuator can be moved from whatever position it was to a preferred position which results in the damper being moved to a fully open position. It should be understood that one large capacitor can be used rather than several small capacitors if desired. The opto-couplers 78 and 80 comprise dual light emitting diodes 82 that can be activated by an AC signal and photo-transistors which provides an output signal at either emitters. More particularly, the opto-coupler 78 has output line 84 that extends to a clockwise control port of the driver 42, whereas the opto-coupler 80 has output line 86 that extends to a counterclockwise control port of the driver.

The automatic operation is achieved by the relay 68 which has an output voltage provided from the drive module 42 via line 88 to normally closed relay contacts 90 and to normally open relay contacts 92. The contacts 90 are connected to the counterclockwise port of the drive circuit 42 and the contacts 92 are connected to the collectors of each of the opto-couplers 78 and 80. When power fails on input lines 62, the capacitor bank 72 powers the drive module 42 so that voltage on line 88 is applied to the counterclockwise port via the relay contacts 90 and line 86 to drive the motor to the desired fully open position. A switch 87 can be moved from the position shown to its upper position to have the motor driven in the opposite direction, if desired.

From the foregoing description, it should be appreciated that a fume hood exhaust terminal for controlling gas flow in an exhaust duct has been shown and described which has many superior operational characteristics and is reliable in its operation. The use of an ultrasonic motor driven actuator for angularly positioning the damper in the terminal has been shown to be simple in design, which contributes to its simplicity and reliability of operation. Additionally, the drive circuitry employed in the preferred embodiment is simple in its design and is effective to accurately control the damper position in a rapid manner. The present invention includes circuitry which is responsive to a power failure to place the damper in a preferred position until power is restored to the exhaust terminal.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A fume hood exhaust terminal for controlling gas flow in an exhaust duct, comprising;

a duct segment having an upstream end, a downstream end and an inner periphery;

a damper disposed in said duct segment adapted to be rotated about an axis to vary the flow of gas passing through said segment between the range of approximately no flow and full flow as a function of the angular position thereof;

an electrically powered ultrasonic drive motor having a rotatable output shaft and a coupling means for attaching said output shaft to said damper axis, said motor being adapted to be selectively driven in clockwise and counterclockwise rotating directions responsive to selective drive signals being applied thereto;

circuit means for selectively energizing said drive motor to cause its output shaft to be rotated in one of said clockwise and counterclockwise directions to place said damper in a desired angular position in response to one of first and second electrical input control signals being applied thereto, said circuit means further comprising:

power supply means adapted to be connected to an AC voltage source and provide a DC voltage on an output line;

detecting means connected to said power supply means and being adapted to generate a predetermined signal on an output line in response to the absence of an AC voltage at the input of said power supply means;

a motor driver module adapted to selectively apply DC voltage to said drive motor in one of two ways responsive to receiving said first and second electrical input control signals to cause its output shaft to selectively rotate in one of clockwise and counterclockwise directions;

an electrical isolation circuit adapted to receive said first and second electrical input control signals and said predetermined signal and selectively provide one of first and second input control signals to said motor driver module, and to provide a predetermined one of said first and second input control signals to said motor drive module in response to receiving said predetermined signal;

at least one capacitor connected to said motor driver module, said at least one capacitor being adapted to provide sufficient power to said motor driver module to drive said motor to move said damper to a predetermined position in the event of a detected absence of AC voltage at the input of said power supply means;

said detecting means comprising an electrical relay having a set of normally closed contacts and a set of normally open contacts, said relay being connected to a power output port of said motor driver module, said port being connected to said electrical isolation circuit via one of said sets of contacts so as to provide power to enable said electrical isolation circuit to provide said first and second input control signals to said motor drive module when said AC voltage source is active, said relay being adapted to provide a predetermined one of said first and second input control signals in response to a power failure being detected.

2. A fume hood exhaust terminal as defined in claim 1 wherein said electrical isolation circuit comprises:

a first opto-coupler having a first light emitting diode connected to receive said first input control signal, said first light emitting diode being operably coupled to a first phototransistor and providing said first input control signal when said first light emitting diode is emitting; and, a second opto-coupler having a second light emitting diode connected to receive said second input control signal, said second light emitting diode being operably coupled to a second phototransistor and providing said second input control signal when said second light emitting diode is emitting.

3. A fume hood exhaust terminal as defined in claim 1 wherein said circuit means energizes said drive motor to cause its output shaft to be rotated to place said damper in one of a fully open and fully closed position in response to said detecting means generating said predetermined signal.

4. A fume hood exhaust terminal as defined in claim 1 wherein said at least one capacitor is at least about 0.2 farad.

5. A fume hood exhaust terminal as defined in claim 1 wherein each of said first and second electrical input control signals are applied to said motor driver module at predetermined input ports.

6. A fume hood exhaust terminal as defined in claim 5 wherein said relay has a relay coil operable connected to said AC voltage source, said coil being adapted to cause said relay to have said set of normally open contacts closed and said set of normally closed contacts open when said AC voltage source is active, said port being connected to said motor driver module via said normally closed contacts when said AC voltage source has failed.

7. A fume hood exhaust terminal as defined in claim 1 wherein said ultrasonic drive motor operates on a voltage of about 12 VDC, and has an output torque of about 0.4 Newton-meters.

* * * * *